US008931644B2

(12) United States Patent
Lean et al.

(10) Patent No.: US 8,931,644 B2
(45) Date of Patent: Jan. 13, 2015

(54) METHOD AND APPARATUS FOR SPLITTING FLUID FLOW IN A MEMBRANELESS PARTICLE SEPARATION SYSTEM

(75) Inventors: Meng H. Lean, Santa Clara, CA (US);
Jeonggi Seo, Albany, CA (US);
Ashutosh Kole, Sunnyvale, CA (US);
Armin R. Volkel, Mountain View, CA (US); Huangpin B. Hsieh, Mountain View, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 0 days.

(21) Appl. No.: 12/120,153

(22) Filed: May 13, 2008

(65) Prior Publication Data
US 2009/0283452 A1 Nov. 19, 2009

(51) Int. Cl.
*B03B 13/00* (2006.01)
*B03B 5/62* (2006.01)
*B03B 5/32* (2006.01)
*B04C 11/00* (2006.01)
*B01D 21/26* (2006.01)
*B03B 11/00* (2006.01)
*B01D 21/30* (2006.01)
*B04C 1/00* (2006.01)
*B01D 21/34* (2006.01)

(52) U.S. Cl.
CPC ... *B04C 1/00* (2013.01); *B03B 5/32* (2013.01); *B04C 11/00* (2013.01); *B01D 21/265* (2013.01); *B03B 13/00* (2013.01); *B03B 11/00* (2013.01); *B01D 21/302* (2013.01); *B03B 5/626* (2013.01); *B01D 21/34* (2013.01)
USPC ............ 209/726; 209/362; 209/434; 209/459

(58) Field of Classification Search
CPC .......... B03B 5/62; B03B 11/00; B03B 13/00; B04C 11/00
USPC .......................... 209/725, 726, 362, 434, 459
See application file for complete search history.

(56) References Cited

U.S. PATENT DOCUMENTS

| 1,133,721 A | 3/1915 | Gregg |
| 1,836,758 A | 12/1931 | Knapp |

(Continued)

FOREIGN PATENT DOCUMENTS

| CN | 1149556 | 5/1997 |
| DE | 2809630 | 9/1978 |

(Continued)

OTHER PUBLICATIONS

Partial European Search Report, App. No. EP 09 15 6592, Oct. 13, 2009.

(Continued)

*Primary Examiner* — Joseph C Rodriguez
(74) *Attorney, Agent, or Firm* — Fay Sharpe LLP

(57) ABSTRACT

A method and system for splitting fluid flow in an outlet of a particle separation device is provided. The system may include static or passive mechanisms or subsystems. These mechanisms could also be modular and interchangeable to provide for preset fluid split divisions of 20:80, 30:70, 40:60, 50:50, . . . etc. In other forms of the presently described embodiments, the system is adjustable and variable. In still another form of the presently described embodiments, the system allows for differential pressure control at the outlets to facilitate the flow of varying size particles or particle bands in the respective channels or paths.

21 Claims, 13 Drawing Sheets

(56) References Cited

U.S. PATENT DOCUMENTS

| | | | |
|---|---|---|---|
| 2,426,804 A | 9/1947 | Roy | |
| 2,584,976 A | 2/1952 | Bialey, Jr. | |
| 2,615,572 A * | 10/1952 | Hodge | 209/454 |
| 3,225,523 A | 12/1965 | Wiebe | |
| 3,672,503 A | 6/1972 | Mark | |
| 3,693,791 A | 9/1972 | Beck | |
| 3,893,921 A | 7/1975 | Walther et al. | |
| 3,933,642 A | 1/1976 | Wilson | |
| 3,947,364 A | 3/1976 | Laval, Jr. | |
| 3,948,771 A * | 4/1976 | Bielefeldt | 210/779 |
| 4,001,121 A | 1/1977 | Bielefeldt | |
| 4,128,474 A | 12/1978 | Ennis | |
| 4,153,541 A | 5/1979 | Rumpf et al. | |
| 4,159,942 A | 7/1979 | Greer et al. | |
| 4,189,378 A * | 2/1980 | Wright et al. | 209/459 |
| 4,292,050 A | 9/1981 | Linhardt et al. | |
| 4,324,334 A * | 4/1982 | Wright et al. | 209/459 |
| 4,343,707 A | 8/1982 | Lucas | |
| 4,383,917 A | 5/1983 | Wells | |
| 4,386,519 A | 6/1983 | Sinkey | |
| 4,451,367 A | 5/1984 | Ruggeri | |
| 4,460,391 A * | 7/1984 | Muller et al. | 55/343 |
| 4,462,907 A | 7/1984 | Waldecker | |
| 4,505,811 A * | 3/1985 | Griffiths et al. | 209/13 |
| 4,542,775 A | 9/1985 | Beck | |
| 4,795,553 A | 1/1989 | Giffard | |
| 4,872,972 A | 10/1989 | Wakabayashi et al. | |
| 4,927,437 A | 5/1990 | Richerson | |
| 5,059,226 A | 10/1991 | Schneider et al. | |
| 5,104,520 A | 4/1992 | Maronde et al. | |
| 5,120,436 A | 6/1992 | Reichner | |
| 5,193,688 A | 3/1993 | Giddings | |
| 5,314,529 A | 5/1994 | Tilton et al. | |
| 5,535,892 A | 7/1996 | Moorhead et al. | |
| 5,556,537 A | 9/1996 | Saarenketo | |
| 5,587,128 A | 12/1996 | Wilding et al. | |
| 5,632,957 A | 5/1997 | Heller et al. | |
| 5,653,859 A | 8/1997 | Parton et al. | |
| 5,690,763 A * | 11/1997 | Ashmead et al. | 156/60 |
| 5,715,946 A | 2/1998 | Reichenbach | |
| 5,728,262 A | 3/1998 | Moss et al. | |
| 5,958,240 A | 9/1999 | Hoel | |
| 5,971,158 A | 10/1999 | Yager et al. | |
| 5,993,668 A | 11/1999 | Duan | |
| 6,013,165 A | 1/2000 | Wiktorowicz et al. | |
| 6,087,608 A | 7/2000 | Schlichter et al. | |
| 6,100,535 A | 8/2000 | Mathies et al. | |
| 6,272,296 B1 | 8/2001 | Gartstein | |
| 6,355,491 B1 | 3/2002 | Zhou et al. | |
| 6,422,735 B1 | 7/2002 | Lang | |
| 6,454,945 B1 | 9/2002 | Weigl et al. | |
| 6,527,125 B2 | 3/2003 | Niitti | |
| 6,569,323 B1 | 5/2003 | Pribytkov | |
| 6,827,911 B1 | 12/2004 | Gering | |
| 6,905,029 B2 | 6/2005 | Flagan | |
| 7,104,405 B2 * | 9/2006 | Bohm et al. | 209/631 |
| 7,156,970 B2 | 1/2007 | Lean et al. | |
| 7,163,611 B2 | 1/2007 | Volkel et al. | |
| 7,226,542 B2 | 6/2007 | Zemel et al. | |
| 7,241,423 B2 | 7/2007 | Golbig et al. | |
| 7,282,129 B2 | 10/2007 | Lean et al. | |
| 7,431,228 B2 | 10/2008 | Bohm et al. | |
| 7,473,216 B2 * | 1/2009 | Lolachi et al. | 494/45 |
| 7,491,307 B2 | 2/2009 | Hsieh et al. | |
| 7,497,334 B2 * | 3/2009 | Tyvoll et al. | 209/3.1 |
| 7,534,336 B2 | 5/2009 | Volkel et al. | |
| 7,584,857 B2 | 9/2009 | Bohm et al. | |
| 7,770,738 B2 | 8/2010 | Tabata et al. | |
| 2002/0130068 A1 | 9/2002 | Fassbender et al. | |
| 2004/0038249 A1 | 2/2004 | Darteil et al. | |
| 2005/0183996 A1 | 8/2005 | Zemel et al. | |
| 2006/0087918 A1 | 4/2006 | Ji et al. | |
| 2006/0118479 A1 | 6/2006 | Shevkoplyas et al. | |
| 2006/0158640 A1 | 7/2006 | Molter et al. | |
| 2006/0240964 A1 | 10/2006 | Lolachi et al. | |
| 2008/0128331 A1 | 6/2008 | Lean et al. | |
| 2009/0014360 A1 | 1/2009 | Toner et al. | |
| 2009/0050538 A1 * | 2/2009 | Lean et al. | 209/155 |
| 2009/0114601 A1 | 5/2009 | Lean et al. | |
| 2009/0114607 A1 | 5/2009 | Lean et al. | |
| 2009/0283455 A1 | 11/2009 | Lean et al. | |
| 2014/0238906 A1 * | 8/2014 | Mohanty et al. | 209/571 |

FOREIGN PATENT DOCUMENTS

| | | | |
|---|---|---|---|
| DE | 2829592 | 1/1980 | |
| DE | 2929139 | 1/1981 | |
| DE | 3736504 | 3/1989 | |
| DE | 4200802 | 7/1993 | |
| DE | 19855256 | 6/2000 | |
| DE | 10001737 | 10/2001 | |
| DE | 102004039182 A1 | 2/2006 | |
| EP | 0448973 | 10/1991 | |
| EP | 1407807 | 4/2004 | |
| EP | 1681549 | 7/2006 | |
| EP | 1795894 A1 * | 6/2007 | G01N 33/49 |
| EP | 1 942 329 A2 | 7/2008 | |
| EP | 2060312 | 5/2009 | |
| FR | 2571354 | 4/1986 | |
| FR | 2753392 | 3/1998 | |
| GB | 330163 | 6/1930 | |
| GB | 386080 A | 1/1933 | |
| GB | 934423 A | 8/1963 | |
| GB | 1039485 A | 8/1966 | |
| GB | 2 012 193 A | 7/1979 | |
| GB | 2024038 A | 1/1980 | |
| GB | 2 098 091 A | 11/1982 | |
| GB | 2 209 969 A | 6/1989 | |
| JP | 60071083 | 4/1985 | |
| JP | 63319017 A | 12/1988 | |
| JP | 02 86876 A | 3/1990 | |
| JP | 5007795 A | 1/1993 | |
| JP | 08206605 A * | 8/1996 | |
| JP | 08-238457 A | 9/1996 | |
| JP | 08276159 A * | 10/1996 | |
| JP | 2001121039 | 5/2001 | |
| JP | 2004-330008 A | 11/2004 | |
| JP | 2007069179 | 3/2007 | |
| JP | 9299712 | 11/2007 | |
| JP | 045049795 B2 | 7/2010 | |
| KR | 20030003206 | 1/2003 | |
| WO | WO8603140 | 6/1986 | |
| WO | WO8810239 | 12/1988 | |
| WO | WO9838134 | 9/1998 | |
| WO | WO2004113877 | 12/2004 | |
| WO | WO2006056219 | 6/2006 | |

OTHER PUBLICATIONS

Singapore Search Report, prepared by Danish PTO, App# 200902885-3, Sep. 16, 2009.

Thiruvenkatachari et al., "Flocculation-cross-flow microfiltration hybrid system for natural organic matter (NOM) removal using hematite as a flocculent," Desalination, Elsevier, Amsterdam, NL, vol. 147, No. 1-3, XP 004386413, pp. 83-88, Sep. 10, 2002.

Yang et al., "Particle Separation in Microfluidic Channels Using Flow Rate Control," Proceedings of IMECE2004-60862, pp. 1-6, Anaheim, CA, Nov. 13-19, 2004.

Takagi et al., "Continuous Particle Separation in a Microchannel having Asymmetrically Arranged Multiple Branches,", Lab on a Chip 2005, Lab Chip, 2005, 5, pp. 778-784, May 19, 2005.

Zhang et al., "Continuous Flow Separation of Particles Within an Asymmetric Microfluidic Device," Lab on a Chip 2006, Lab Chip, 2006, 6, pp. 561-566, Mar. 13, 2006.

Narayanan et al., "A Microfabricated Electrical SPLITT System," Lab on a Chip 2006, Lab Chip, 2006, 6, pp. 105-114, Dec. 5, 2005.

Kapishnikov et al., "Continuous Particle Size Separation and Size Sorting Using Ultrasound in a Microchannel," Journal of Statistical Mechanics: Theory and Experiment, P01012, pp. 1-15, 2006.

Brenner, "Polymer Fabrication and Microfluidic Unit Operations for Medical Diagnostics on a Rotating Disk," Dissertation at Institute of Microsystems, University of Frieburg, Dec. 2005.

(56) References Cited

OTHER PUBLICATIONS

Ookawara et al., "Feasibility Study on Concentration of Slurry and Classification of Contained Particles by Microchannel," Chemical Engineering Journal, v. 101, pp. 171-178, 2004.

Matthews et al., "Particle Flow Modelling on Spiral Concentrators: Benefits of Dense Media for Coal Processing?," Second International Conference on CFD in the Minerals and Process Industries, CSIRO, Melbourne, Australia, pp. 211-216, Dec. 6-8, 1999.

Shi et al., "Radial Capillary Array Electrophoresis Microplate and Scanner for High-Performance Nucleic Acid Analysis," Analytical Chemistry, vol. 71, No. 23, pp. 5354-5361, Dec. 1, 1999.

Chiu et al., "High Radial Acceleration in MicroVortices", Nature, vol. 425, Sep. 4, 2003.

Tuval et al., "Neutrally Buoyant Particles and Bailout Embeddings in Three-Dimensional Flows," 5th International Summer School/Conference Proceedings, Let's Face Chaos Through Nonlinear Dynamics (online), Jun. 30-Jul. 14, 2002, Jul. 2002 (retrieved on Jan. 21, 2009). Retrieved from the Internet: http://www.camtp.uni-mb.si/chaos/2002/reports/abstracts.shtml.

Gascoyne et al., "Particle Separation by Dielectrophoresis," Electrophoresis 2002, 23, pp. 1973-1983, Houston, Texas, 2002.

Bennett et al., "Combined Field-Induces Dielectrophoresis and Phase Separation for Manipulating Particles in Microfluidics," American Institute of Physics, vol. 82, No. 23, pp. 4866-4868, Dec. 8, 2003.

Inglis et al., "Continuous Microfluidic Immunomagnetic Cell Separation," American Institute of Physics, vol. 85, No. 21, pp. 5093-5095, Nov. 22, 2004.

Giddings, "Field-Flow Fractionation: Analysis of Macromolecular, Colloidal, and Particulate Materials," Science, vol. 260, pp. 1456-1465, Jun. 4, 1993.

Reschiglian et al., "Field-Flow Fractionation and Biotechnology," TRENDS in Biotechnology, vol. 23, No. 9, pp. 475-483, Sep. 9, 2005.

Segré et al., "Radial Particle Displacements in Poiseuille Flow of Suspensions," Nature Publishing Group, No. 4760, pp. 209-210, Jan. 21, 1961.

Segré et al., "Behaviour of Macroscopic Rigid Spheres in Poiseuille. Flow Part 2. Experimental Results and Interpretation," Weizmann Institute of Schence, Rehovoth, Israel, pp. 136-157, and in revised form Mar. 16, 1962.

Leighton et al., "The Lift on a Small Sphere Touching a Plane in the Presence of a Simple Shear Flow," Journal of Applied Mathematice and Physics (ZAMP), vol. 36, pp. 174-178, Jan. 1985.

Cherukat et al., "The Inertial Lift on a Rigid Sphere in a Linear Shear Flow Field Near a Flat Wall," J. Fluid Mech. 1994, vol. 263, pp. 1-18, in revised form Aug. 18, 1993.

Saffman, "The Loft on a Small Sphere in a Slow Shear Flow," J. Fluid Mech. 1965, vol. 22, Part 2, pp. 385-400.

Rubinow et al., "The Transverse Force on a Spinning Sphere Moving in a Viscous Fluid," Institute of Mathematical Sciences, New York University, New York, pp. 447-459, Mar. 13, 1961.

Ho et al., "Inertial Migration of Rigid Spheres in two-Dimensional Unidirectional Flows," J. Fluid Mech. 1974, vol. 65, Part 2, pp. 365-400.

Vasseur et al., "The Lateral Migration of a Spherical Particle in Two-Dimensional Shear Flows," J. Fluid Mech. 1976, vol. 78, Part 2, pp. 385-413.

Feng et al., "Direct Simulation of Initial Value Problems for the Motion of Solid Bodies in a Newtonian Fluid. Part 2., Couette and Poiseuille Flows," J. Fluid Mech. 1994, vol. 277, pp. 271-301, in revised form May 11, 1994.

Asmolov, "The Inertial Lift on a Spherical Particle in a Plane Poiseuille Flow at Large Channel Reynolds Number," J. Fluid Mech. 1999, vol. 381, pp. 63-87, in revised form Sep. 10, 1998.

Asmolov, "The Inertial Lift on a Small Particle in a Weak-Shear Parabolic Flow," American Institute of Physics, vol. 14, No. 1, Jan. 2002.

Matas et al., "Inertial Migration of Rigid Spherical Particles in Poiseuille Flow," J. Fluid Mech. 2004, vol. 515, pp. 171-195, in revised form Apr. 19, 2004).

Yang et al., "Migration of a Sphere in Tube Flow," J. Fluid Mech. 2005, vol. 540, pp. 109-131, in revised form Apr. 13, 2005.

Michaelides, "Hydrodynamic Force and Heat/Mass Transfer From Particles, Bubbles, and Drops—The Freeman Scholar Lecture," Journal of Fluids Engineering, vol. 125, pp. 209-238, Mar. 2003.

Cherukat et al., "Wall-Induced Lift on a Sphere," Int. J. Multiphase Flow, vol. 16, No. 5, 1990, pp. 899-907, in revised form Apr. 1, 1990).

Cherukat et al., "The Inertial Lift on a Rigid sphere Translating in a Linear Shear Flow Field," Int. J. Multiphase Flow, vol. 20, No. 2, 1994, pp. 339-353, in revised form Oct. 10, 1993.

Berger et al., "Flow in Curved Pipes," Ann. Rev. Fluid Mech. 1983, vol. 15, pp. 461-512, 1983.

Gupalo et al., "Velocity Field of a Liquid Stream in a Spiral Channel of Rectangular Cross Section," pp. 109-112. Translated from Izvestiya Adademii Nauk SSSR, Mekhanika Zhidkosti I Gaza, No. 1, pp. 131-136, Jan.-Feb. 1977. Original article submitted Jan. 8, 1976.

Dean, "Fluid Motion in a Curved Channel," Imperial College of Science, pp. 402-420, Jul. 31, 1928.

Sudarsan et al., "Multivortex Micromixing," PNAS, vol. 103, No. 19, pp. 7228-7233, May 9, 2006.

Xia et al., "Soft Lithography," Annu. Rev. Mater. Sci. 1998, vol. 28, pp. 153-184, 1998.

Sao et al., "Integrated Multiple Patch-Clamp Array Chip Via Lateral Cell Trapping Junctions," American Institute of Physics, vol. 84, No. 11, pp. 1973-1975, Mar. 15, 2004.

Ookawara et al., A Numerical Study of the Influence of Particle Density on Lift Force-Induced Separation in a Micro-Separator/Classifier by a Macroscopic Particle Model, Journal of Chemical Engineering of Japan, vol. 40, No. 11, pp. 986-992, 2007.

Ookawara et al., "Quasi-direct numerical simulation of life force-induced particle separation in a curved microchannel by use of a macroscopic particle model," Chemical Engineering Science 62, pp. 2454-2465, 2007.

Ookawara et al., "Applicability of a Miniaturized Micro-Separator/Classifier to Oil-Water Separation," Chem. Eng. Technol., 30, No. 3, pp. 316-321, 2007.

Ookawara et al., "Numerical study on development of particle concentration profiles in a curved microchannel," Chemical Engineering Science, 61, pp. 3714-3724, 2006.

Ookawara et al., "A numerical study on a macroscopic Stokes number based on shear-induced interparticle collisions in a micro-separator/classifier," Chemical Engineering Journal 135S, pp. S21-S29, 2008.

* cited by examiner

METHOD AND APPARATUS FOR SPLITTING FLUID FLOW IN A MEMBRANELESS PARTICLE SEPARATION SYSTEM

CROSS REFERENCE TO RELATED PATENTS AND APPLICATIONS

This application is related to co-pending, commonly assigned U.S. patent application Ser. No. 11/606,460, filed Nov. 30, 2006, entitled "Particle Separation and Concentration System," U.S. patent application Ser. No. 11/936,729, filed Nov. 7, 2007, entitled "Fluidic Device and Method for Separation of Neutrally Buoyant Particles," U.S. application Ser. No. 11/936,753, filed Nov. 7, 2007, entitled "Device and Method for Dynamic Processing in Water Purification," and co-pending, commonly assigned U.S. patent application Ser. No. 12/120,093, filed May 13, 2008, entitled "Fluidic Structures for Membraneless Particle Separation," and naming Lean et al. as inventors.

BACKGROUND

Several different types of membraneless particle separation devices having a generally spiral or curved configuration have been described in U.S. patent application Ser. No. 11/606,460, filed Nov. 30, 2006, entitled "Particle Separation and Concentration System," U.S. patent application Ser. No. 11/936,729, filed Nov. 7, 2007, entitled "Fluidic Device and Method for Separation of Neutrally Buoyant Particles," U.S. application Ser. No. 11/936,753, filed Nov. 7, 2007, entitled "Device and Method for Dynamic Processing in Water Purification," and co-pending, commonly assigned U.S. patent application Ser. No. 12/120,093, filed May 13, 2008, entitled "Fluidic Structures for Membraneless Particle Separation," and naming Lean et al. as inventors.

In general, such devices are useful in connection with particles having density differences compared with water, thus creating centrifugal or buoyancy forces necessary for transverse migration through the channel for purposes of separation. Some of these devices are also useful, depending on their configuration to separate neutrally buoyant particles. With reference to FIG. 1, one example form of a separation device 20 is shown. This form shows an exemplary spiral channel 22 with increasing radius of curvature. This geometry takes advantage of the rate of pressure change. Any suitable form will suffice. However, for example, in another form, the device may have a contracting spiral channel with a decreasing radius of curvature for the sidewalls. The channel may also maintain a substantially constant radius of curvature and a constant channel size. In any of these cases, or others, the channel 22 evolves into two separate channels 24 and 26 (e.g. also referred to as channel #1 and channel #2 in FIG. 1 to allow for multiple outlet paths).

These types of separation devices provide for particle separation in a variety of manners. For example, depending on the flow rate, the particle separation may be driven by the centrifugal force or the pressure that is created by flow fluid through the channel. In any of these cases, the objective is for particle separation to occur. Typically the fluid flow will then have a first portion with particles of one type of particle or band and a second portion having fluid without the particles of the first portion therein.

In these types of systems, it would be desirable to provide for enhanced separation at the outlet of the devices.

INCORPORATION BY REFERENCE

This application is related to co-pending, commonly assigned U.S. patent application Ser. No. 11/606,460, filed Nov. 30, 2006, entitled "Particle Separation and Concentration System," U.S. patent application Ser. No. 11/936,729, filed Nov. 7, 2007, entitled "Fluidic Device and Method for Separation of Neutrally Buoyant Particles," U.S. application Ser. No. 11/936,753, filed Nov. 7, 2007, entitled "Device and Method for Dynamic Processing in Water Purification," and co-pending, commonly assigned U.S. patent application Ser. No. 12/120,093, filed May 13, 2008, entitled "Fluidic Structures for Membraneless Particle Separation," and naming Lean et al. as inventors, all of which are incorporated herein by this reference in their entirety.

BRIEF DESCRIPTION

In one aspect of the presently described embodiments, a particle separation device comprises an inlet operative to receive fluid having particles dispersed therein, at least one curved channel operative to generate a flow field comprising a first portion and a second portion, and, an outlet including a mechanism to split the flow such that the first portion flows on a first path and the second portion flows on a second path.

In another aspect of the presently described embodiments, the outlet includes a knife edge.

In another aspect of the presently described embodiments, the knife edge is operative to pivot.

In another aspect of the presently described embodiments, the knife edge is operative to slide.

In another aspect of the presently described embodiments, the outlet comprises a system to generate a pressure differential between the first path and the second path.

In another aspect of the presently described embodiments, the system comprises a first valve positioned in the first path and a second valve positioned in the second path.

In another aspect of the presently described embodiments, the device further comprises a feedback system.

In another aspect of the presently described embodiments, the feedback system is operative to control the device based on at least one of pressure, bandwidth and flow rate.

In another aspect of the presently described embodiments, the feedback system is operative to control the device based on at least one of viscosity and temperature.

In another aspect of the presently described embodiments, the system comprises at least two channels having an actuator disposed between the channels, wherein the actuator selectively deforms walls of the channel to generate a pressure differential.

In another aspect of the presently described embodiments, the system comprises at least two channels having two actuators disposed between the channels, wherein each actuator selectively deforms a wall of one of the channels to generate a pressure differential.

In another aspect of the presently described embodiments, the system comprises compression rings positioned and operative to selectively apply pressure to channels corresponding to the first and second paths.

In another aspect of the presently described embodiments, the method comprises initiating fluid flow in the separation device, and, adjusting a mechanism in the outlet to vary the fluid flow between the first and second outlet paths.

In another aspect of the presently described embodiments, the adjusting comprises moving a knife edge within the outlet.

In another aspect of the presently described embodiments, the adjusting comprises a changing pressure with the device.

In another aspect of the presently described embodiments, changing the pressure is based on operation of at least one actuator.

In another aspect of the presently described embodiments, changing the pressure is based on manipulation of at least one of compression rings and expansion rings.

In another aspect of the presently described embodiments, changing the pressure is based on initiation of at least one valve.

In another aspect of the presently described embodiments, the adjusting is based on feedback data items.

In another aspect of the presently described embodiments, the data items are based on at least one of pressure, bandwidth, flow rate, viscosity and temperature.

DETAILED DESCRIPTION

Figure 1:
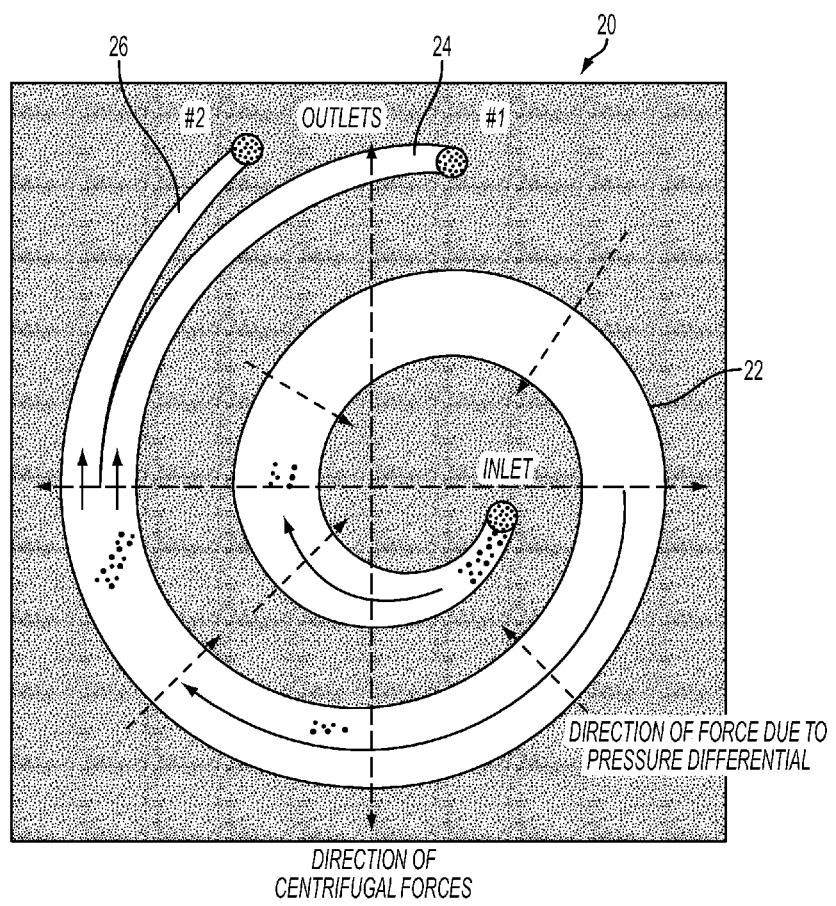
FIG. 1 is a representation of an example spiral particle separation device.

The presently described embodiments provide for a mechanism at the outlet of a spiral separation device for splitting, or bifurcating, the fluid flow. This is particularly advantageous in spiral or curved devices because the outlet of the separation device typically will have different size particles on one side of the channel relative to the other side of the channel. In some forms, one side of the channel may have a band of particles flowing therein while the opposite side of the channel has very few resident particles. This is particularly true where neutrally buoyant particles are flowing and separated in a fluid. In at least one form, the portion of the fluid flow containing particles (or relatively more particles) is referred to as the particulate stream, while the remaining portion of the fluid is referred to as the effluent stream.

The presently described embodiments provide a splitting system to the outlet of the various separation devices that is transparent to the fluid flow. That is, implementation of the presently described embodiments does not typically cause dispersion or otherwise compromise the integrity of a focused particle band or group of particles, does not create undue turbulence, and does not cause excessive pressure fluctuations that would impair the desired fluid flow. The presently described embodiments allow for adaptability of the split of fluid flow, e.g. in a range from a 20:80 split to an 80:20 split. Suitable flow sensing and computer feedback control may also be applied to the system.

The presently described embodiments may take a variety of forms, as those of skill in the art will appreciate. As described herein, the presently described embodiments may include static or passive mechanisms or subsystems. These mechanisms could also be modular and interchangeable to provide for preset fluid split divisions of 20:80, 30:70, 40:60, 50:50, . . . etc. In other forms of the presently described embodiments, the system is adjustable and variable. In still another form of the presently described embodiments, the system allows for differential pressure control at the outlets to facilitate the flow of varying size particles or particle bands in the respective channels or paths.

With reference to FIGS. 2-12, it should be appreciated that the mechanisms illustrated may also be implemented in a variety of different environments and configurations. Some of these are described in, for example, co-pending, commonly assigned U.S. patent application Ser. No. 11/606,460, filed Nov. 30, 2006, entitled "Particle Separation and Concentration System," U.S. patent application Ser. No. 11/936,729, filed Nov. 7, 2007, entitled "Fluidic Device and Method for Separation of Neutrally Buoyant Particles," U.S. application Ser. No. 11/936,753, filed Nov. 7, 2007, entitled "Device and Method for Dynamic Processing in Water Purification," and co-pending, commonly assigned U.S. patent application Ser. No. 12/120,093, filed May 13, 2008, entitled "Fluidic Structures for Membraneless Particle Separation," and naming Lean et al. as inventors, all of which are incorporated herein by this reference in their entirety. For ease of illustration and explanation, such mechanisms are shown herein as applied to a single channel, in simple form and/or in representative environments. For example, it will be understood by those of skill in the art that these techniques and structures may be implemented in multiple and repetitive fashion where, for example, a plurality of channels are configured within a device or system.

Figure 2:
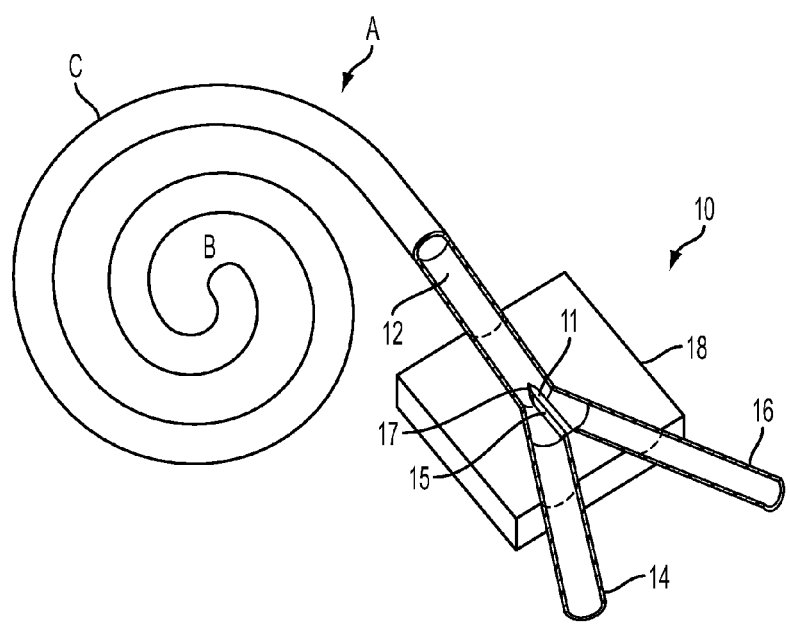
FIG. 2 illustrates a form of the presently described embodiments.

With reference now to FIG. 2, a spiral separation device A having an inlet B, curved channel portion C, and outlet 10 is illustrated. It will be appreciated that the separation device A is shown merely in representative form for ease of explanation. FIGS. 3-12 do not specifically show a full separation device, but it will be understood that any of the outlets of these drawings could be applied to the contemplated separation devices, such as that shown in FIG. 2.

As shown, the end 12 of the spiral channel C is split into a first channel or path 14 and a second channel or path 16. This channel configuration is shown to be resident in a substrate 18. However, it will be appreciated that other forms of or environment for the outlet may exist. Notably, the split of the channels 14 and 16 from the end 12 of the spiral device C is facilitated and enhanced by a knife mechanism 11 formed of a generally static wall 15 having a knife edge 17 protruding into the end 12. In this regard, the flow of fluid and separation thereof is enhanced.

It should be appreciated the shape of the knife edge may well depend on the channel cross section. For example, rectangular shaped channels may have rectangular shaped knife edges while elliptical shaped channels (e.g. formed by vertically deforming a tube) may have a parabolic shaped knife edge. Of course, other shapes for the knife edges and corresponding walls are contemplated by the presently described embodiments.

Figure 3:
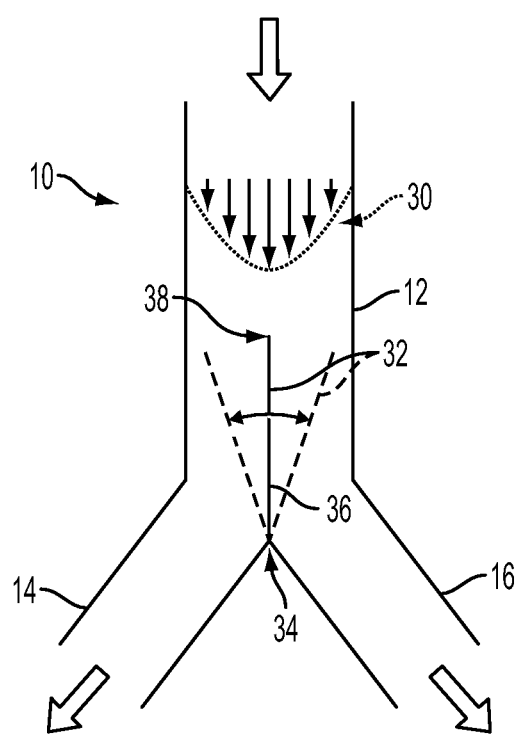
FIG. 3 illustrates a form of the presently described embodiments.

With reference now to FIG. 3, another form of the presently described embodiments is shown. A parabolic fluid flow 30 is illustrated as flowing through the end 12 of the spiral device (not shown) and being divided in the outlet 10 to flow in a first channel 14 or the second channel 16. In these embodiments, however, the knife edge mechanism 32 is pivoted at a point 34 near the separation of the channels. Although only representatively shown, the knife edge mechanism 32 includes a wall 36 and a knife edge portion 38. As can be seen, the knife edge device 32 can pivot through a range of positions, as exemplary shown by the arrow and dotted lines. As noted above, in at least one form, this range will provide relative fluid flow in the two channels in a range from 20:80 to 80:20. It will be appreciated by those of skill in the art that the pivoting of the knife edge device 32 may be accomplished in a variety of different manners using a variety of different techniques. The dimensions of the channel may dictate the technology to actuate the pivot in the knife edge device 32. For example, in one form, pivoting may be accomplished utilizing piezoelectric devices or hydraulic devices. It should also be appreciated that the pivot may be accomplished manually.

Figure 4:
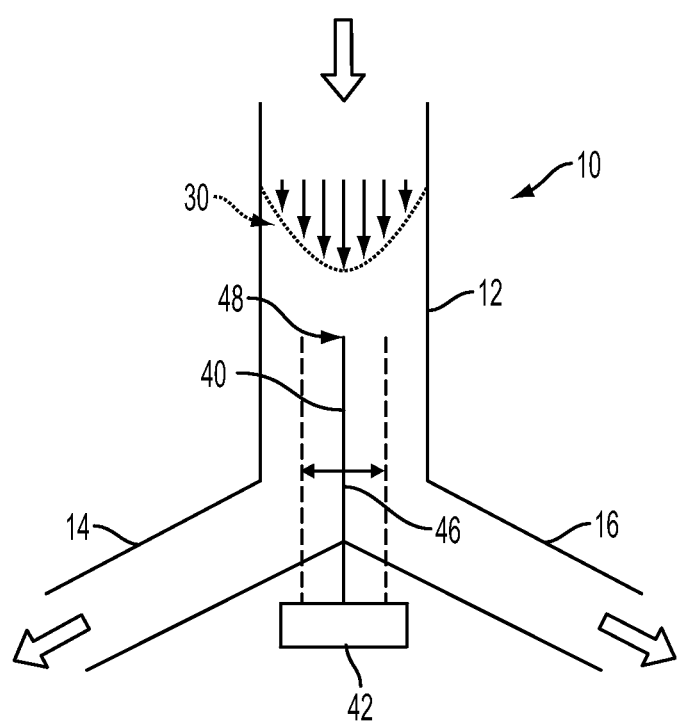
FIG. 4 illustrates a form of the presently described embodiments.

With reference now to FIG. 4, a parabolic fluid flow 30 is illustrated as flowing in the end 12 of the channel of the spiral device (not shown) and being split or bifurcated in the outlet 10 into fluid flow down the first channel 14 and the second channel 16. However, in this embodiment, the knife edge mechanism 40 is adapted to slide on, for example, a rail of an external actuator 42. As with the other embodiments, it will appreciated that the knife edge device 40 includes a wall 46, as well as a suitable knife edge portion 48. It will further be appreciated that the external actuator may take a variety of forms. Again, depending on the relative dimensions of the separation device and other environmental factors, the external actuator may be a piezoelectric actuator, hydraulic actuator or a manual actuator.

Figure 5:
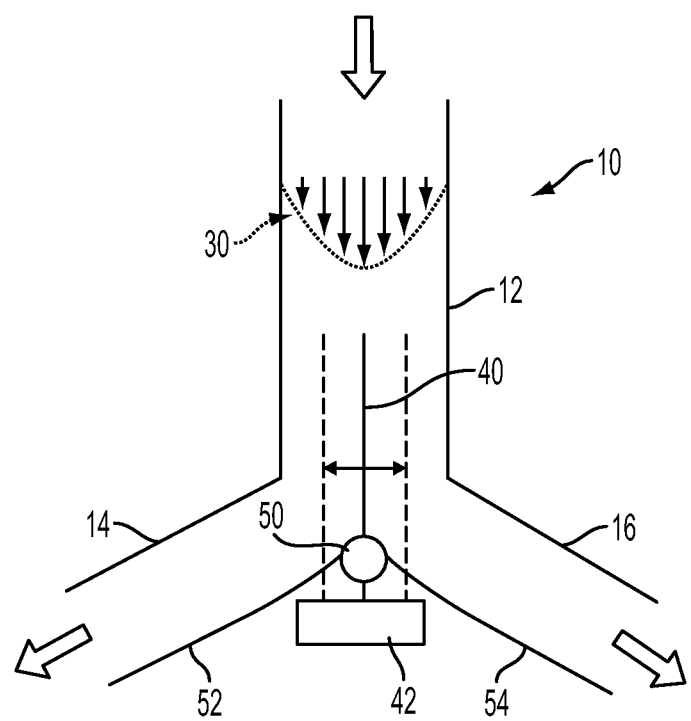
FIG. 5 illustrates a form of the presently described embodiments.
Figure 6:
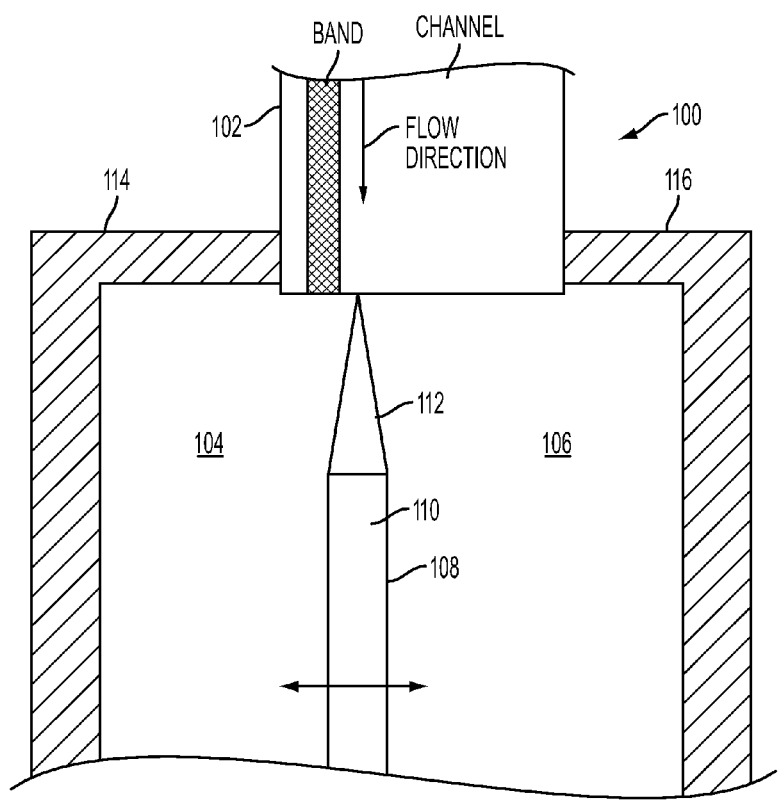
FIG. 6 illustrates a form of the presently described embodiments.

With reference now to FIG. 5, the outlet 10 of the separation device (not shown) has a parabolic fluid flow 30 flowing through the end 12 of the channel which is split into the first channel 14 and the second channel 16. Also shown are the knife edge mechanism 40 and the external actuator 42. However, in this embodiment, a sliding pin 50 is provided to channel wall portions 52 and 54 of the first and second channels 14 and 16, respectively. It will be appreciated that the wall portions 52 and 54 are formed of a flexible membrane. The flexible membrane may be formed of a variety of suitable materials. This allows the pin 50 to slide in the external actuator 42, thus changing the position of the knife edge device 40. The flexibility of the wall portions 52 and 54 allow the channel integrity to be maintained.

The embodiments illustrated in FIGS. 2-5 illustrate configurations wherein the knife edge extends into the end of the channel at the end of the separation device. However, the presently described embodiments also contemplate configurations wherein the knife edge does not extend into the channel—but, for example, merely abuts the end of the channel or the appropriate channel stack. For example, with reference now to FIG. 6, an outlet 100 of a separation device is illustrated. As shown, a channel 102 of the separation device is split into a first channel 104 and a second channel 106 by a knife mechanism 108. As with the other embodiments, the knife mechanism 108 includes a wall portion 110 as well as a knife edge 112. In this configuration, outer walls 114 and 116 are also illustrated. In operation, in this embodiment, the knife edge mechanism 108 slides along a rail or by way of other types of actuators, to split the fluid flow in a variable and adaptable way. As shown, a band or group or concentration of particles could flow into the first channel 104 while the remaining fluid—not including the band (or group or concentration) of particles—could flow through the second channel 106.

Figure 7:
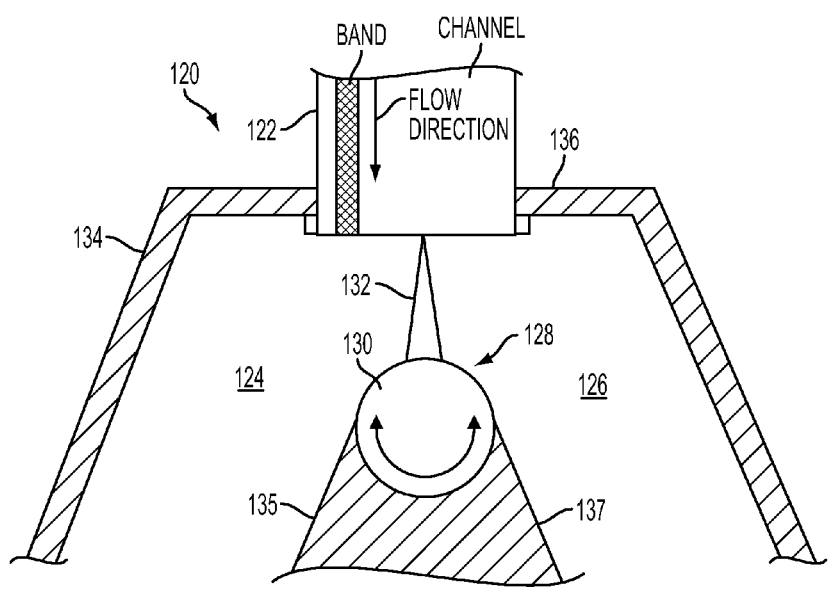
FIG. 7 illustrates a form of the presently described embodiments.

With reference now to FIG. 7, a further embodiment wherein the knife edge does not extend into the end of the channel is illustrated. As shown, the outlet 120 for the end 122 of a separation device includes a first channel 124 and a second channel 126. A splitting or bifurcation of the fluid flow is accomplished using a mechanism 128 comprising a rotating cylinder 130 and a knife edge 132. The channel 124 is defined by an outer wall 134 and an inner wall 135. Likewise, channel 126 is defined by an outer wall 136 and an inner wall 137. It should be appreciated that the knife edge 132 is rotated to change the split ratio at the end of the channel 122. The inner walls 135 and 137 are configured to accommodate such rotation. For example, the inner walls 135 and 137 could be flexible in nature—which would allow for them to be attached to the rotating cylinder. In other forms, the inner walls 135 and 137 may simply static in nature, with suitable sealing techniques to ensure no leakage between the inner walls 135 and 137 and the rotating cylinder 130.

Figure 8:
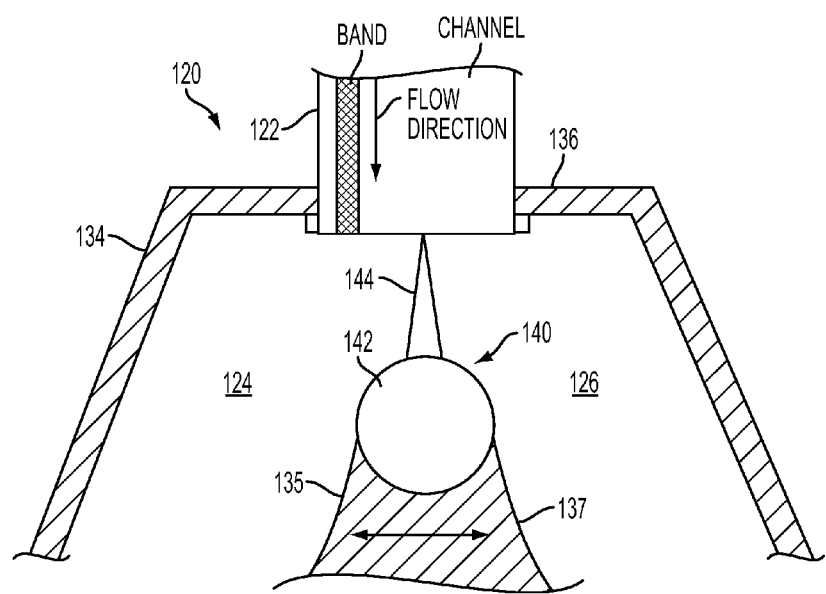
FIG. 8 illustrates a form of the presently described embodiments.

With reference now to FIG. 8, an outlet 120 of a separation device (not shown) includes the end of the channel 122 being divided into the first channel 124 and the second channel 126. In this configuration, a mechanism 140 is provided to the system to split the fluid flow. The mechanism 140 includes a sliding cylinder 142, as well as a knife edge 144. As with the previous embodiment, the channel 124 is defined by an outer wall 134 and an inner wall 135. Likewise, the channel 126 is defined by an outer wall 136 and an inner wall 137. In this embodiment, the inner walls 135 and 137, in at least one form, are formed of a flexible membrane to allow for the sliding of the cylinder 142, yet still maintaining the fluid within the channels 124 and 126.

Figure 9:
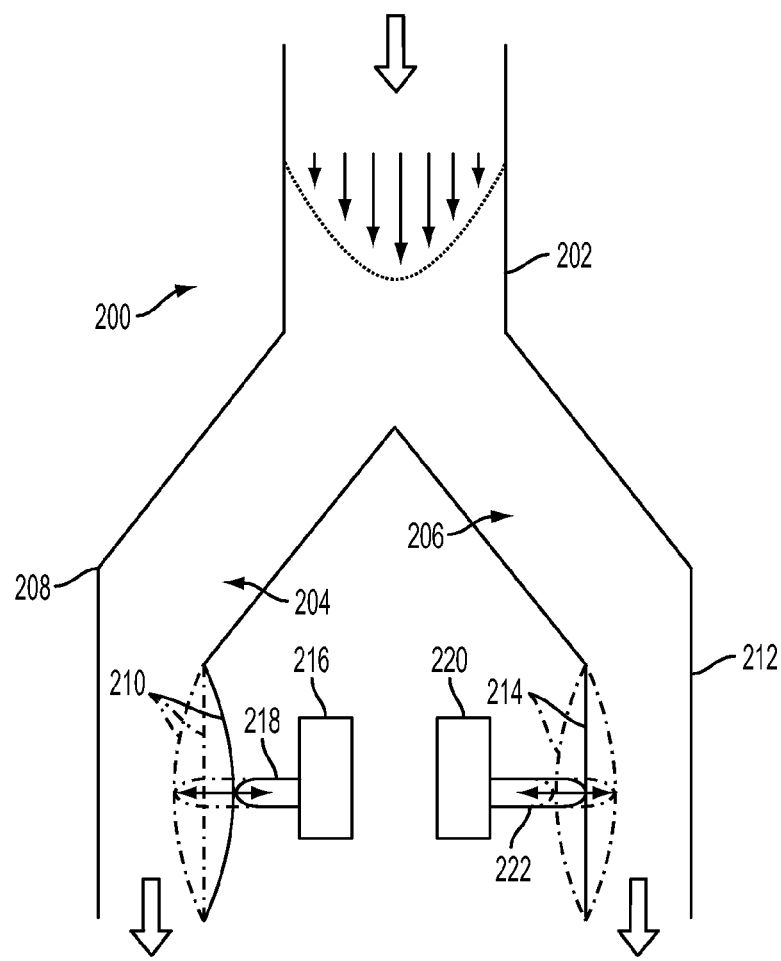
FIG. 9 illustrates a form of the presently described embodiments.
Figure 10A:
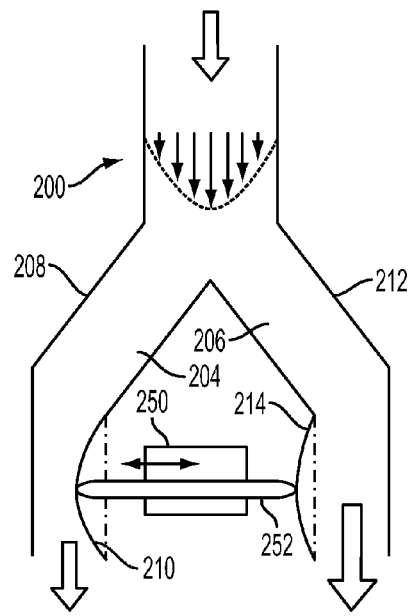
FIGS. 10(a)-10(b) illustrate one form of the presently described embodiments.
Figure 10B:
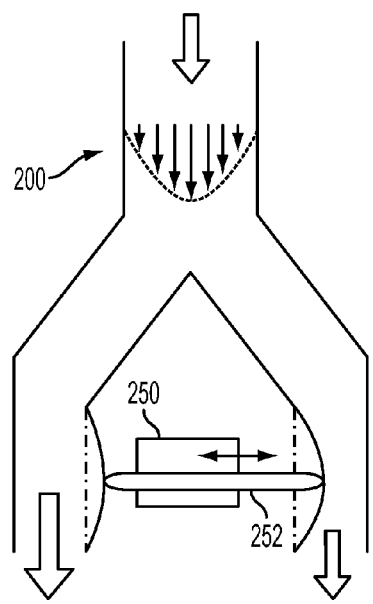
Figure 11:
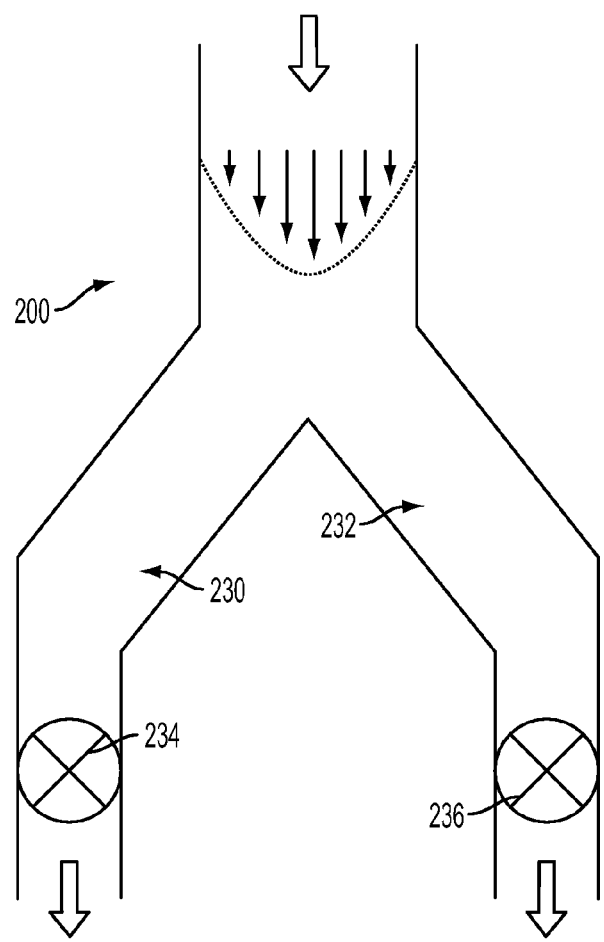
FIG. 11 illustrates a form of the presently described embodiments

With reference now to FIGS. 9 through 11, varying the split or bifurcation of the fluid flow in the spiral separation devices contemplated herein may also be accomplished using differential pressure or flow control at the respective outlets. In the presently described embodiments, this differential pressure and/or flow control can be accomplished using independently controlled actuators or a simultaneous two-way actuation for adjacent channels. Flexible membrane walls for the outlet channels are typically used to allow for deformation. The deformation of the wall will modify the flow cross section and, thus, the pressure on the upstream fluid. Flow control valves can be implemented independently on the outlet channels. The channels in this case need not be flexible.

With reference now to FIG. 9, an outlet 200 showing the end 202 of a channel of a spiral separation device (not shown) is shown. The channel 202 is split between a first channel 204 and a second channel 206. The channel 204 is defined by a rigid outer wall 208, as well as a flexible inner wall 210. The channel 206 is defined by a rigid outer wall 212 and a flexible inner wall 214. In this embodiment, an actuator 216 having a plunger 218 (e.g. a solenoid) is actuated to deform the wall 210 in a variety of different manners to create differential pressure upstream in the channel. Likewise, an actuator 220 having a plunger 222 is utilized to deform wall 214 to achieve desired differential pressure or flow control. It will be appreciated that the actuators can be controlled in a variety of different manners to accomplish the objectives of the presently described embodiments. For example, one of the actuators could be actuated to create differential pressure and flow control. Or, both of the actuators can be actuated in tandem or in a complementary manner, at the same or varying rates, to generate differential pressure and flow control.

With reference to FIGS. 10(a) and (b), the system 200 includes only a single actuator 250. The single actuator 250 includes a plunger 252 that is sized to manipulate both flexible walls 210 and 214. As shown in FIG. 10(a), the plunger 252 is shown in an extreme position to the left. FIG. 10(b) shows an opposite extreme position to the right.

In either of the embodiments of FIGS. 9 and 10, it will be appreciated that implementation of the actuators will create a differential pressure and flow control in the channel that will allow for varying degrees of particle flow in each of the channels 204 and 206.

Another manner of achieving such a result is to provide adjustable valves in each or at least one of the outlet paths or channels. As shown in FIG. 11, a system 200 includes a first channel 230 and a second channel 232. The first channel 230 has positioned therein a valve 234. The second channel 232 has positioned therein a valve 236. Thus, two separate valves are able to control the flow in the channels. In this case, the walls of the channels 230, 232 need not be flexible. In addition, the valves may take a variety of known forms; however, in at least one form, the valves are in-line valves. Selective operation of the valves will create a desired differential pressure and flow control in the system. It should be appreciated that one valve is sufficient to divide the flow between the two outlets without impacting the inlet pressure.

Figure 12:
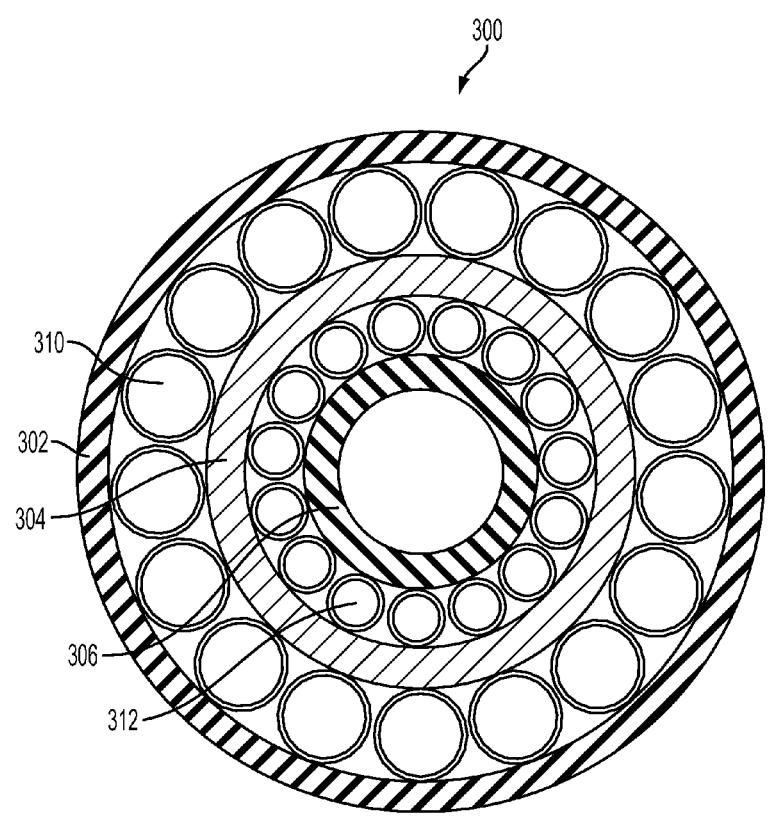
FIG. 12 illustrates a form of the presently described embodiments.

With reference now to FIG. 12, another embodiment relying on differential pressure and/or flow control within a system to split the fluid flow is shown. In this embodiment, radial compression of bifurcated outlets is used to do so. An end view of an outlet 300 is shown. The outlet includes a compliant outer ring 302, a rigid ring 304 and a compliant inner ring 306. A first set of channels 310 is disposed between the outer ring 302 and the rigid ring 304. A second set of channels 312 is disposed between the rigid ring 304 and the compliant inner ring 306. It will be appreciated that the set of channels 310 corresponds to a first set of outlet channels that have been split, such as channel 204 of FIG. 10(a). The second set of channels 312 relates to a second set of channels that have been split from an outlet, such as channel 206 of FIG. 10(a). Those of skill in the art will appreciate that this configuration results from the implementation of a plurality of separation devices and the suitable gathering of the flow paths or channels, as shown.

The pressure in the channels can be adjusted by manipulating channel diameters and relative flow rates of inner and outer streams of fluid by reciprocal radial compression/expansion of inner and outer rings 302 and 306. The rings 302 and 306 can be compressed and/or expanded simultaneously, or individually, to create a differential pressure and/or flow control in the system. It will be understood by those of skill in the art that ring compression could provide for more uniform and smoother transitions. However, ring expansion will also achieve the objectives of the presently described embodiments. It should also be understood that all inner and outer channels may ultimately be combined, in one form, downstream, depending on the configuration of the overall system.

It should be understood that the embodiments illustrated herein serve as mere examples. Variations are contemplated. For example, each outlet shown and described herein is split or bifurcated into two channels. The split of the outlet (and this application of the presently described embodiments) may be extended to three or more channels.

Also, it will be understood that the materials used to construct the various configurations contemplated herein will vary as a function of the dimensions, application and environment of the system. Likewise, the dimensions of the contemplated systems may vary.

As noted, the presently described embodiments may include various sensing and feedback control to allow for the enhanced splitting of the fluid flow. For example, optical sensors may be placed in the system prior to the point of splitting or bifurcation and, at a midway point, may be used to detect bandwidth and location. A feedback signal may be sent to the splitting mechanisms to maximize band capture and fluid recovery in the channels. A flow sensor may also be provided along the channeling to detect velocity variations. This data may then be used to feedback to necessary pumps to maintain constant flow rate, and hence, velocity. A pressure sensor could also be provided to adjust flow rate in each channel to minimize band dispersion and to maximize flow recovery. Temperature sensors may be used to correct fluidic operation and viscosity sensors may be used to correct for adjustment in operation parameters.

It should be appreciated that these types of sensing and feedback control devices may be implemented in a variety of different manners within the system to achieve the sensing and feedback objectives noted herein and others. In this regard, these types of devices may be implemented using different hardware configurations and/or software techniques that are suited to the environment and system configuration.

Figure 13:
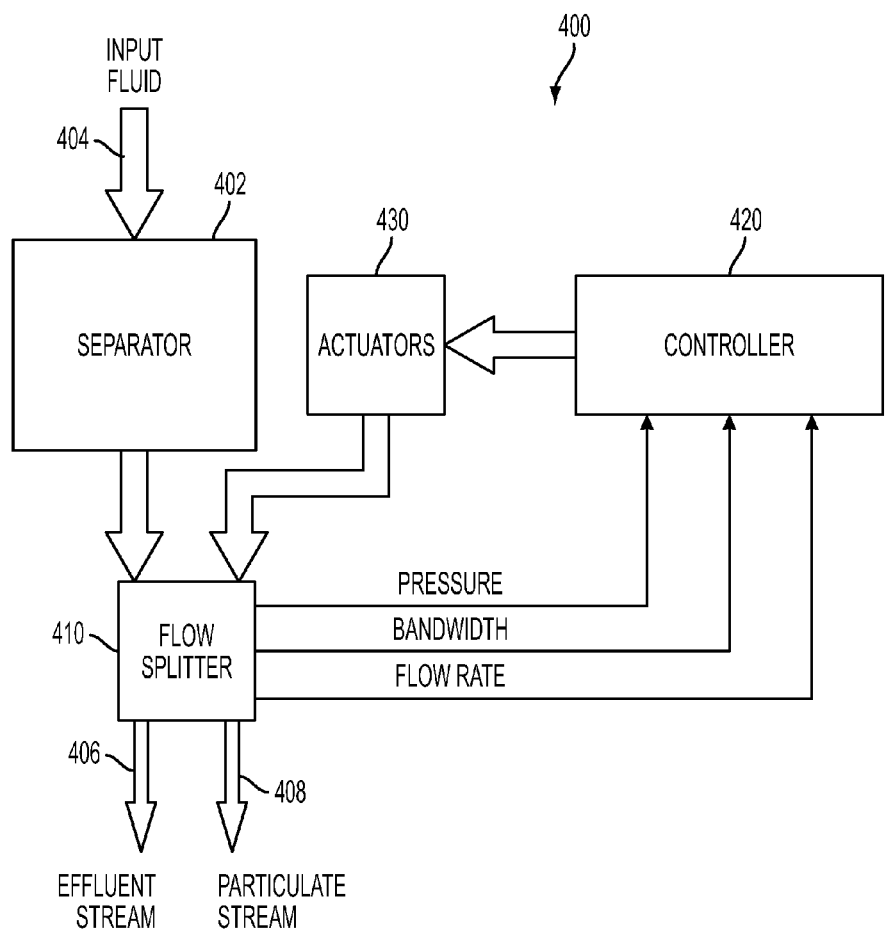
FIG. 13 illustrates a form of the presently described embodiments.

With reference to FIG. 13, an example feedback and/or control system 400 is illustrated. The system 400 includes a separator such as a spiral separator 402 that receives input fluid 404. In operation, the separator 402 separates the input fluid 404 into an effluent stream 406 and a particulate stream 408. As shown, the process is enhanced through the use of any of a variety of flow splitters 400 contemplated herein. It will be understood that the flow splitter may be controlled based on various data items that are collected. These data items include, for example, pressure, bandwidth and flow rate. As noted above, temperature and viscosity sensors may also be used to collect desired data. Such data items are fed to a controller 420. The controller 420 controls actuators 430, which are used to split the fluid, as will be understood from the above embodiments. It will be understood that the actuators 430 and the flow splitter may be integrated in the same device.

It will also be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A particle separation device comprising:
   an inlet operative to receive fluid having particles dispersed therein;
   at least one curved channel operative to generate a flow field comprising a first portion and a second portion, the first and second portions of the flow field being formed by flow driven forces generated by the flow field in the curved channel, the flow driven forces including centrifugal forces and at least flow pressure forces or buoyancy forces;
   an outlet including a mechanism to split the fluid such that the first portion flows on a first path and the second portion flows on a second path; and
   a controller configured to control the mechanism based on pressure, flow rate, bandwidth, temperature or viscosity.

2. The device as set forth in claim 1 wherein the mechanism includes a knife edge.

3. The device as set forth in claim 2 wherein the knife edge is operative to pivot.

4. The device as set forth in claim 2 wherein the knife edge is operative to slide.

5. The device as set forth in claim 1 wherein the mechanism comprises a system to generate a pressure different between the first path and the second path.

6. The device as set forth in claim 5 wherein the system comprises at least two channels having an actuator disposed between the channels, wherein the actuator selectively deforms walls of the channel to generate a pressure differential.

7. The device as set forth in claim 5 wherein the system comprises at least two channels having two actuators disposed between the channels, wherein each actuator selectively deforms a wall of one of the channels to generate a pressure differential.

8. The device as set forth in claim 5 wherein the system comprises compression rings positioned and operative to selectively apply pressure to channels corresponding to the first and second paths.

9. The device as set forth in claim 5 wherein the system comprises a first valve positioned in the first path and a second valve positioned in the second path.

10. The device as set forth in claim 1 further comprising a feedback system including the controller.

11. The device as set forth in claim 10 wherein the feedback system collects data items on at least one of pressure, bandwidth and flow rate.

12. The device as set forth in claim 10 wherein the feedback system collects data items on at least one of viscosity and temperature.

13. A method for splitting fluid flow at an outlet of a particle separation device having a first and second outlet path, the method comprising:
    initiating fluid flow in the separation device, wherein particle separation between the first and second outlet paths results from flow driven forces generated by fluid flow in a curved channel of the particle separation device, the flow driven forces including centrifugal forces and at least flow pressure forces or buoyancy forces; and,
    adjusting a mechanism in the outlet to vary the fluid flow between the first and second outlet paths, based on at least one of pressure, bandwidth, flow rate, viscosity or temperature, using a controller.

14. The method as set forth in claim 13 wherein the adjusting comprises moving a knife edge within the outlet.

15. The method as set forth in claim 13 wherein the adjusting comprises a changing pressure with the device.

16. The method as set forth in claim 15 wherein changing the pressure is based on operation of at least one actuator.

17. The method as set forth in claim 15 wherein changing the pressure is based on manipulation of at least one of compression rings and expansion rings.

18. The method as set forth in claim 15 wherein changing the pressure is based on initiation of at least one valve.

19. The method as set forth in claim 13 wherein the adjusting is based on feedback data items fed to the contoller.

20. The method as set forth in claim 19 wherein the data items are based on at least one of pressure, bandwidth, flow rate, viscosity and temperature.

21. A particle separation device comprising:
    an inlet operative to receive fluid having particles dispersed therein;
    at least one curved channel operative to generate a flow field comprising a first portion and a second portion, the first and second portions of the flow field being formed by flow driven forces generated by the flow field in the curved channel, the flow driven forces including centrifugal forces and at least flow pressure forces or buoyancy forces;
    an outlet including a mechanism to split the fluid such that the first portion flows on a first path and the second portion flows on a second path, the mechanism being shaped based on a cross-section of the channel, and
    a controller configured to control the mechanism based on pressure, flow rate, bandwidth, temperature or viscosity.

* * * * *